(12) United States Patent
Lassalle

(10) Patent No.: US 10,683,082 B2
(45) Date of Patent: Jun. 16, 2020

(54) HYDRAULIC ACTUATION SYSTEMS

(71) Applicant: Ratier-Figeac SAS, Figeac (FR)

(72) Inventor: Julien Lassalle, Saint-Jean-Lagineste (FR)

(73) Assignee: RATIER-FIGEAC SAS, Figeac (FR)

( * ) Notice: Subject to any disclaimer, the term of this patent is extended or adjusted under 35 U.S.C. 154(b) by 182 days.

(21) Appl. No.: 15/498,707

(22) Filed: Apr. 27, 2017

(65) Prior Publication Data

US 2017/0313406 A1 Nov. 2, 2017

(30) Foreign Application Priority Data

Apr. 29, 2016 (EP) ..................................... 16305502
Apr. 29, 2016 (EP) ..................................... 16305505

(51) Int. Cl.
*B64C 11/40* (2006.01)
(52) U.S. Cl.
CPC .................................... *B64C 11/40* (2013.01)
(58) Field of Classification Search
CPC ................................ B64C 11/40; B64C 11/38
USPC ....................................................... 416/27, 46
See application file for complete search history.

(56) References Cited

U.S. PATENT DOCUMENTS

| | | | | |
|---|---|---|---|---|
| 4,750,862 A * | 6/1988 | Barnes | ..................... | B64C 11/30 416/157 R |
| 5,037,271 A * | 8/1991 | Duchesneau | ........... | B64C 11/38 416/157 R |
| 5,042,966 A * | 8/1991 | Schwartz | ................ | B64C 11/38 416/157 R |
| 5,174,718 A * | 12/1992 | Lampeter | ................ | B64C 11/38 416/157 R |
| 5,186,608 A | 2/1993 | Bagge | | |
| 5,836,743 A * | 11/1998 | Carvalho | .............. | B64C 11/385 416/139 |

(Continued)

FOREIGN PATENT DOCUMENTS

| EP | 1485288 A1 | 12/2004 |
|---|---|---|
| GB | 2197912 A | 6/1988 |

(Continued)

OTHER PUBLICATIONS

Extended European Search Report for International Application No. 16305505.6, dated Feb. 1, 2017, 10 pages.

*Primary Examiner* — J. Todd Newton
(74) *Attorney, Agent, or Firm* — Cantor Colburn LLP

(57) ABSTRACT

An hydraulic actuation control module is provided for installation in a pitch change actuator of a propeller assembly. The module comprises a flow metering valve arranged to supply hydraulic fluid flow and pressure to an actuator and an electronic control unit arranged to control the flow metering valve. The flow metering valve is arranged to meter hydraulic fluid flow and pressure to increase and decrease pitch chambers of the pitch change actuator, in accordance with the control of the electronic control unit. The flow metering valve is arranged to receive an hydraulic fluid supply from an entity relative to which the propeller assembly rotates such as an engine driving the propeller assembly or aircraft on which the propeller assembly is installed. A propeller assembly comprising the hydraulic actuation control module is also disclosed, together with a method of installing the module within a propeller assembly.

13 Claims, 4 Drawing Sheets

(56) References Cited

U.S. PATENT DOCUMENTS

| | | | | |
|---|---|---|---|---|
| 5,897,293 | A * | 4/1999 | Arel | B64C 11/303 |
| | | | | 416/114 |
| 6,059,528 | A * | 5/2000 | Danielson | B64C 11/303 |
| | | | | 416/153 |
| 6,196,797 | B1 * | 3/2001 | Bogden | B63H 3/06 |
| | | | | 416/157 R |
| 6,261,062 | B1 * | 7/2001 | Amerling | B63H 3/082 |
| | | | | 416/147 |
| 6,672,835 | B1 * | 1/2004 | Hughes | B64C 11/301 |
| | | | | 416/155 |
| 6,851,929 | B2 | 2/2005 | Goldberg | |
| 7,602,081 | B2 | 10/2009 | Stonestreet, II et al. | |
| 8,439,640 | B2 | 5/2013 | Arel et al. | |
| 2003/0002983 | A1 * | 1/2003 | Perkinson | B64C 11/40 |
| | | | | 416/48 |
| 2003/0180146 | A1 * | 9/2003 | Arel | B63H 3/082 |
| | | | | 416/1 |
| 2006/0029496 | A1 * | 2/2006 | Carvalho | B64C 11/30 |
| | | | | 416/1 |
| 2007/0212220 | A1 | 9/2007 | Perkinson et al. | |
| 2007/0212221 | A1 * | 9/2007 | Carvalho | B64C 11/303 |
| | | | | 416/46 |
| 2009/0196747 | A1 * | 8/2009 | McCallum | F04D 29/362 |
| | | | | 416/31 |
| 2010/0008779 | A1 | 1/2010 | Carvalho et al. | |
| 2011/0164998 | A1 * | 7/2011 | Swift | B64C 11/308 |
| | | | | 417/374 |
| 2011/0171030 | A1 * | 7/2011 | Swift | F01D 7/00 |
| | | | | 416/159 |
| 2011/0274544 | A1 * | 11/2011 | Swift | B64C 11/385 |
| | | | | 416/147 |
| 2011/0274546 | A1 * | 11/2011 | Swift | B64C 11/385 |
| | | | | 416/157 B |
| 2011/0274547 | A1 * | 11/2011 | Morgan | B64C 11/325 |
| | | | | 416/157 B |
| 2012/0263593 | A1 * | 10/2012 | McCallum | F04D 29/362 |
| | | | | 416/147 |
| 2013/0280065 | A1 * | 10/2013 | Danielson | B64C 11/38 |
| | | | | 416/1 |
| 2017/0313406 | A1 * | 11/2017 | Lassalle | B64C 11/40 |
| 2019/0092453 | A1 * | 3/2019 | Hoemke | B64C 11/385 |

FOREIGN PATENT DOCUMENTS

| | | |
|---|---|---|
| WO | 2007061913 A2 | 5/2007 |
| WO | 2015092201 A2 | 6/2015 |

* cited by examiner

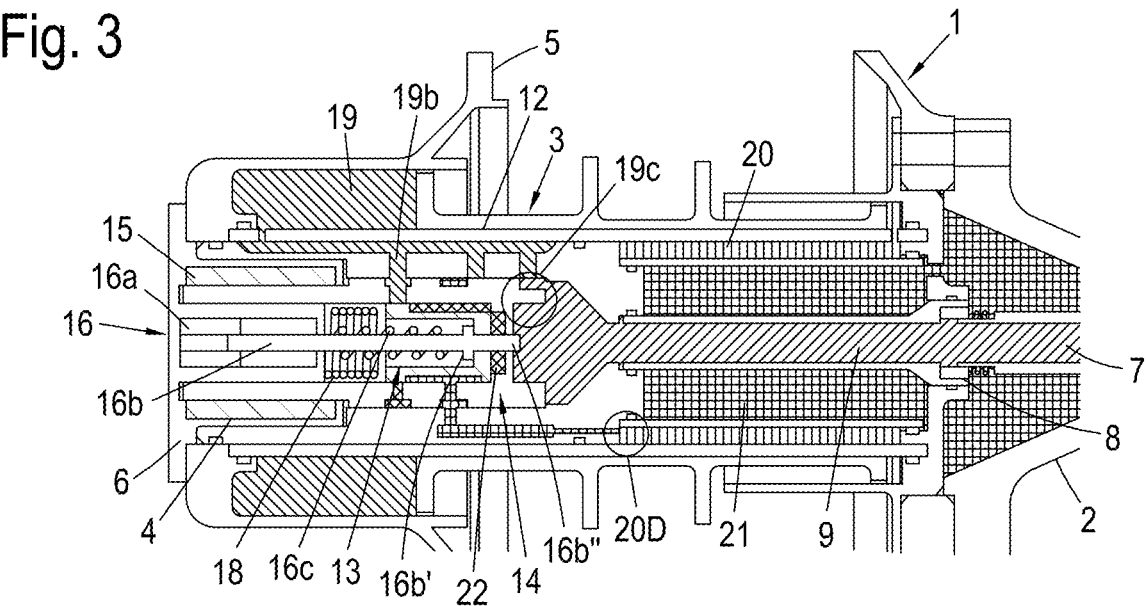
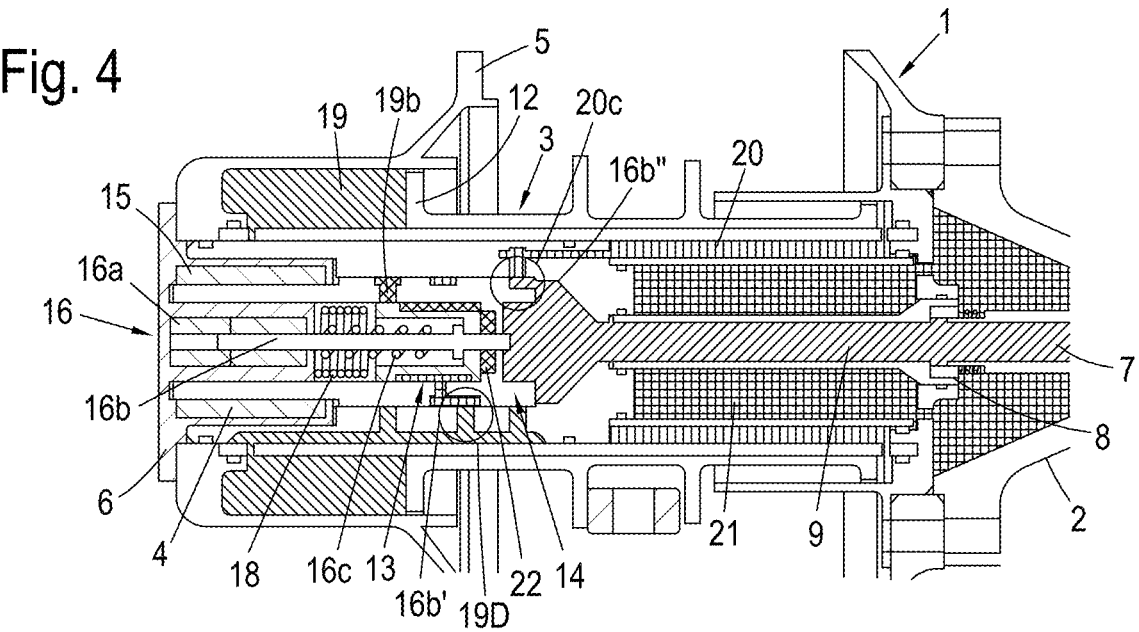

Fig. 5
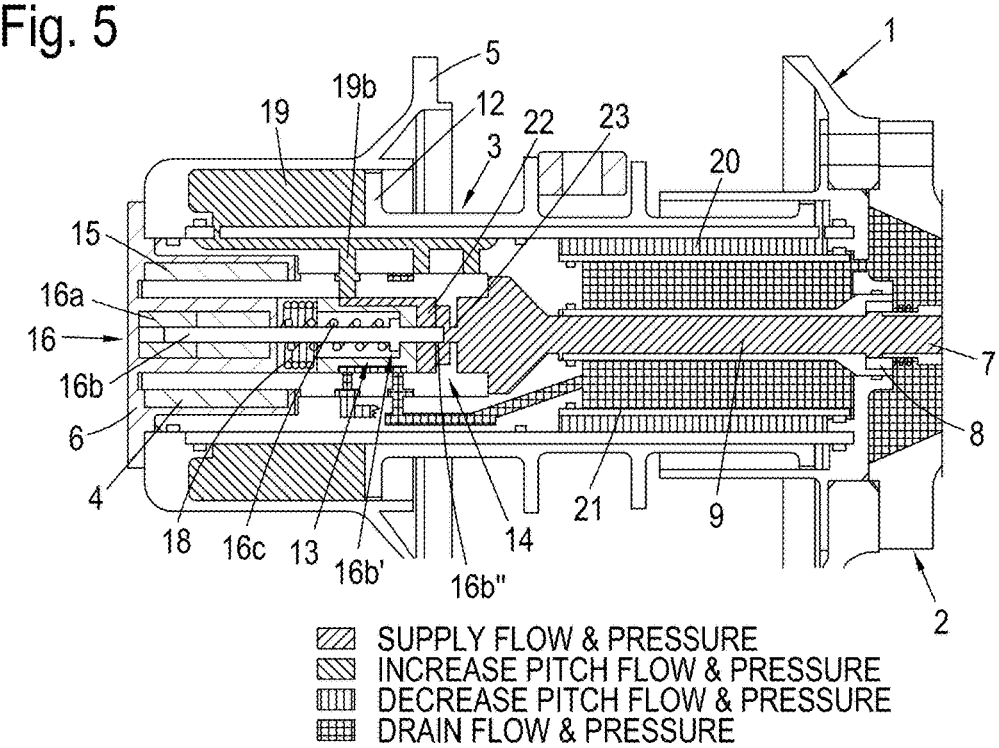
▨ SUPPLY FLOW & PRESSURE
▧ INCREASE PITCH FLOW & PRESSURE
▥ DECREASE PITCH FLOW & PRESSURE
▤ DRAIN FLOW & PRESSURE
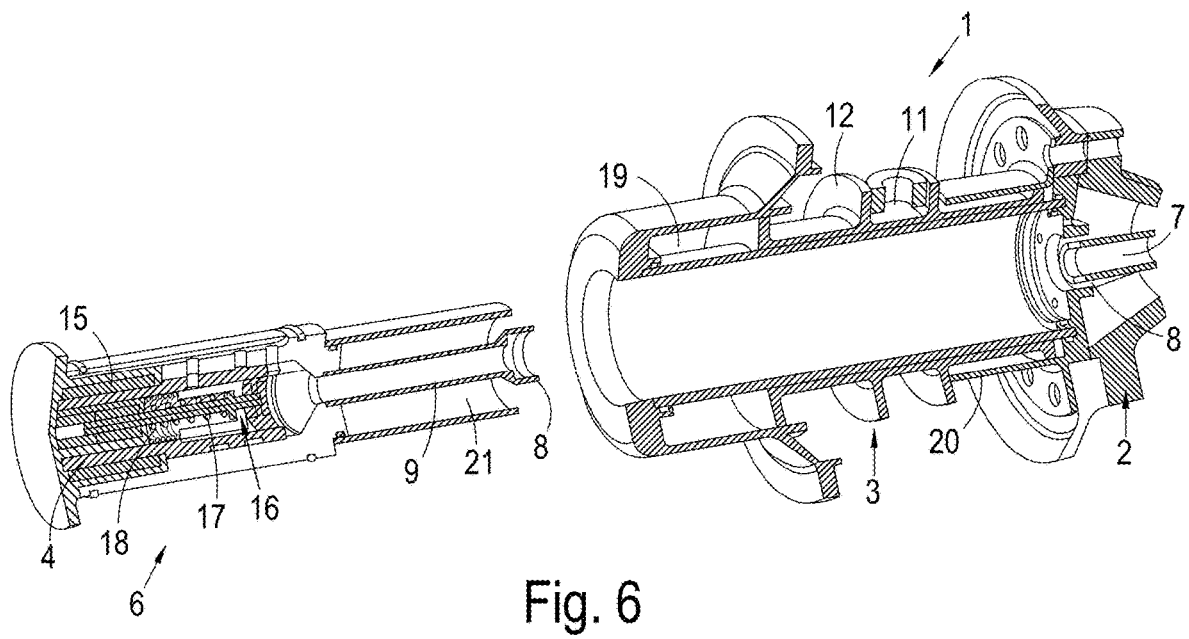
Fig. 6

HYDRAULIC ACTUATION SYSTEMS

FOREIGN PRIORITY

This application claims priority to European Patent Application 16305505.6 filed on Apr. 29, 2016 and European Patent Application 16305502.3 filed on Apr. 29, 2016, the entire contents of which are incorporated herein by reference.

TECHNICAL FIELD

The present invention relates to hydraulic actuation systems, in particular hydraulic actuation systems for propellers, such as pitch change actuators.

BACKGROUND OF THE INVENTION

Hydraulic actuation systems that use hydraulic power to facilitate mechanical motion (e.g. linear, rotary or oscillatory motion) have many uses across a range of technologies. An hydraulic actuation system typically comprises an hydraulic power supply, a metering valve (e.g. an electro-hydraulic servo valve or direct drive servo valve) controlled by an electronic servo controller, and an actuator driven by the hydraulic flow from the flow metering valve. A typical linear hydraulic actuator comprises a hollow tube along which a piston can slide and can be single-acting or double-acting. In a double-acting actuator, hydraulic fluid pressure is applied from a chamber on each side of a piston, and the pressure differential between the two chambers moves the piston one way or the other.

Propeller pitch control systems commonly use hydraulic actuation systems to control the pitch of the propeller blades, known as pitch change actuators. Variable pitch propellers are employed on many different types of vehicles, such as aircraft. Typically, propeller blades are mounted to a rotary hub for pivotable movement about their longitudinal axis to permit pitch adjustment. The pitch adjustment is controlled by a linear double-acting hydraulic pitch change actuator housed within the rotating hub assembly. On one side of the piston is an "increase pitch pressure chamber" and on the other side a "decrease pitch pressure chamber", with the differential pressure between the two moving the piston so as to cause the pitch angle to increase or decrease. The pitch change actuator is driven by a metering valve e.g. an electrohydraulic servo valve or direct drive servo valve, for pressuring the pitch change actuator chambers to effectuate a desired change in pitch of the propeller blades. The electrohydraulic servo valve or direct drive servo valve is fed by hydraulic fluid from the engine lubrication system, and is controlled by a servo controller utilising feedback from position sensors. The position sensors may be installed within the rotating propeller system, an LVDT or an RVDT can sense actuator position or blade pitch angle for instance. The positions sensors may also be installed on the engine where magnetic sensors can sense blade and propeller rotational speed targets and generate a voltage pulse stream that can be read by the engine or the aircraft control computers.

Such pitch change actuators are well known in the art, for example in U.S. Pat. No. 8,439,640B2.

In existing pitch change actuation systems, the servo controller, hydraulic power supply and metering valve are located in the static part of the nacelle, e.g. the static part of the engine driving the propeller. The servo valve delivers hydraulic fluid flow and pressure to a coarse pitch hydraulic supply line and to a fine pitch hydraulic supply line which are provided, through a hydrodynamic bearing, to the rotating part of the propeller and thereby to the actuator.

However, this transfer of hydraulic power from the static part of the nacelle to the rotating part requires the use of complex systems and a number of subsystems installed on the engine gear box such as a Propeller Control Module and high pressure pumps (main supply pump and electrical auxiliary pump for redundancy in case of failure of the main oil circuit). Reliability, maintenance, weight and performance of the pitch change actuation are impacted by the complexity of the architecture. Furthermore, the number of LRUs installed on the engine gear box increases the number of subcomponents interfacing with the engine.

In known propeller system architectures, the propeller is fed with hydraulic fluid (oil) by the engine turbomachinery lubrication circuit and the drain is returned to the engine. Therefore, propeller drain pressure is not constant and depends on engine lubrication system behaviour. The variation in drain pressure affects the accuracy of the metering valves. The air content of the oil coming from the engine is sometimes significant as this oil is also used for lubrication of turbomachinery. The air content of the oil is a well-known issue in hydraulic actuation systems which can affect the actuation performance. The oil is also subject to the pollution that could be collected by the oil along the engine lubrication system.

The hydraulic fluid (oil) used for propeller actuation is typically a lubrication oil also used for the turbomachinery lubrication, since this oil supply is already present. However, this type of oil does not have the same physical characteristics as oil which is dedicated to actuation and that is typically used in some other aircraft actuation systems (like Skydrol which has a reduced changed in viscosity versus temperature operating range).

The present disclosure seeks to address the above described issues.

SUMMARY

From one aspect, the present disclosure provides an hydraulic actuation control module for installation in a pitch change actuator of a propeller assembly, the module comprising: a flow metering valve arranged to supply hydraulic fluid flow and pressure to an actuator; and an electronic control unit arranged to control the flow metering valve.

In embodiments, the flow metering valve is arranged to meter hydraulic fluid flow and pressure to increase and decrease pitch chambers of the pitch change actuator, in accordance with the control of the electronic control unit.

In embodiments, the flow metering valve is a rotary electrohydraulic servo valve or rotary direct drive valve which is arranged to meter hydraulic fluid flow and pressure to increase and decrease pitch chambers according to an angular position to which it is rotated; or the flow metering valve is a linear electrohydraulic servo valve or a linear direct drive valve.

In embodiments, the module further comprises a protection valve arranged to enable hydraulic fluid flow and pressure from an hydraulic fluid flow and pressure supply circuit to be supplied to the increase pitch chamber whilst bypassing the flow metering valve; wherein preferably the protection valve is controlled by at least one solenoid and is arranged to open and close a flow path between an hydraulic fluid flow and pressure supply circuit and the increase pitch chamber; the solenoid being arranged such that when it is not energised the protection valve closes the flow path and when it is energised the protection valve is moved so as to open the flow path.

In embodiments, the electronic control unit is arranged to further provide control for a pitchlock system with which the propeller assembly is provided.

In embodiments, the flow metering valve is arranged to receive an hydraulic fluid supply from an entity relative to which the propeller assembly rotates; wherein preferably the flow metering valve is arranged to receive an hydraulic fluid supply from a static part of an engine that drives the propeller assembly, preferably from the engine lubrication system; or from an aircraft system of an aircraft on which the propeller assembly is installed.

In embodiments, the flow metering valve is arranged to receive an hydraulic fluid supply via a single static hydraulic supply line; and/or the flow metering valve is arranged to receive an hydraulic fluid supply from a reservoir within the propeller assembly.

In embodiments, a high pressure pump is installed in the module for pressurising the hydraulic fluid prior to being received by the flow metering valve.

In embodiments, the module further comprises an auxiliary pump installed in the module, the pump being arranged to pressurise an auxiliary fluid supply from an auxiliary fluid reservoir within the propeller assembly; and the pump being arranged to supply pressurised auxiliary fluid to the flow metering valve according to the control of the electronic control unit.

In embodiments, the electronic control unit is arranged to receive electrical power from a power providing entity relative to which the propeller assembly rotates, wherein preferably the power providing entity is an electrical generator of an engine that drives the propeller assembly, or an electrical supply of an aircraft on which the propeller assembly is installed; and/or the electronic control unit is arranged to receive electronic commands from a command providing entity relative to which the propeller assembly rotates; wherein preferably the command providing entity is an engine control unit of an engine that drives the propeller assembly, an aircraft control unit of an aircraft on which the propeller assembly is installed or the cockpit of an aircraft on which the propeller assembly is installed This disclosure also provides a propeller assembly comprising a pitch change actuator, wherein the propeller assembly is arranged to receive an hydraulic actuation control module in accordance with any of the embodiments described above within the pitch change actuator; wherein optionally the propeller assembly comprises a pitchlock system and the electronic control unit is arranged to further provide control for the pitchlock system.

In embodiments, the propeller assembly is arranged to receive an hydraulic fluid supply via a single static hydraulic supply line for supplying the flow metering valve; and/or wherein the propeller assembly comprises an hydraulic fluid reservoir for supplying the flow metering valve; wherein preferably the propeller assembly or hydraulic actuation control module comprises a high pressure pump arranged to pressurise the hydraulic fluid flow prior to being received by the flow metering valve.

In embodiments, the propeller assembly or hydraulic actuation control module further comprises an auxiliary pump arranged to pump hydraulic fluid from a segregated part of the hydraulic fluid reservoir or from a second independent fluid reservoir within the propeller assembly, to the metering valve in the event of failure of the high pressure pump or loss of supply from a supply circuit including the single static hydraulic fluid supply line; wherein preferably the propeller assembly or hydraulic actuation module further comprises a regulating valve for pressurising the second independent fluid reservoir.

This disclosure further provides a method of installing an hydraulic actuation control module as described in any of the above embodiments in a pitch change actuator of a propeller assembly, comprising sliding it into a housing within the actuator.

In embodiments, the method may further comprise effecting an hydraulic fluid connection between a single static hydraulic supply line and the propeller assembly, preferably by means of a mechanical seal or single hydrodynamic bearing.

This disclosure further provides a propeller comprising: a pitch change actuator;

a flow metering valve arranged to supply hydraulic fluid flow and pressure to the pitch change actuator; and an electronic control unit arranged to control the flow metering valve; wherein the flow metering valve is arranged to meter hydraulic fluid flow and pressure to increase and decrease pitch chambers of the pitch change actuator, in accordance with the control of the electronic control unit; and wherein the flow metering valve is arranged to receive an hydraulic fluid supply via a single static hydraulic fluid supply line and/or wherein the propeller comprises an hydraulic fluid reservoir and the flow metering valve is arranged to receive an hydraulic fluid supply from the reservoir.

In the described module, propeller assembly, method or propeller according to embodiments of the present disclosure described above, the propeller may be an aircraft propeller, a boat propeller or a wind turbine.

This disclosure further provides an aircraft comprising a propeller assembly as described in any of the above embodiments, wherein the aircraft comprises an engine for driving the propeller assembly or propeller; wherein preferably hydraulic fluid is supplied to the propeller assembly or propeller via a static hydraulic supply line within a rotating shaft of the engine, the engine preferably comprising a high pressure pump installed on the engine for pressurising hydraulic fluid from the engine lubrication system for providing to the static hydraulic supply line and thereby the flow metering valve; and/or wherein preferably the propeller assembly or propeller comprises an hydraulic fluid reservoir and a high pressure pump for pressurising hydraulic fluid flow from the reservoir for supplying to the flow metering valve.

BRIEF DESCRIPTION OF THE DRAWINGS

Some exemplary embodiments of the present disclosure will now be described by way of example only and with reference to the accompanying drawings, in which:

FIG. 3 is a sectional view of the propeller assembly of FIG. 1 wherein hydraulic fluid is being supplied to the increase pitch chamber;

FIG. 4 is a sectional view of the propeller assembly of FIG. 1 wherein hydraulic fluid is being supplied to the decrease pitch chamber, this section is a different section to that shown in FIG. 3;

FIG. 5 is a sectional view of the propeller assembly of FIG. 1 when in "protection" mode, this section is a different section to that shown in FIGS. 1-3;

FIG. 6 is a partial cutaway perspective view of the embodiment of FIG. 1 illustrating how the hydraulic actuation control module may be slidably removed from the propeller assembly;

DETAILED DESCRIPTION

Figure 1:
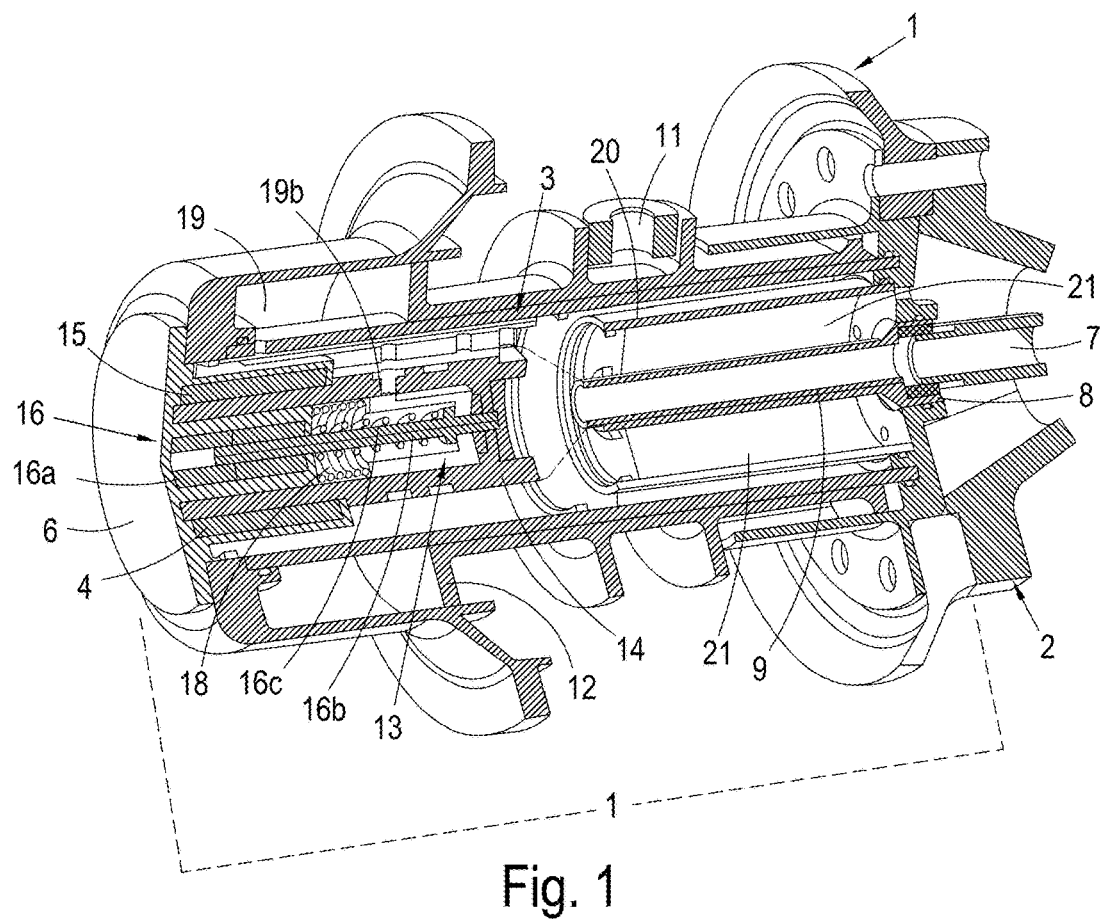
FIG. 1 is a partial cutaway perspective view of a first embodiment of a propeller assembly comprising an hydraulic actuation control module according to an embodiment of this disclosure.
Figure 2:
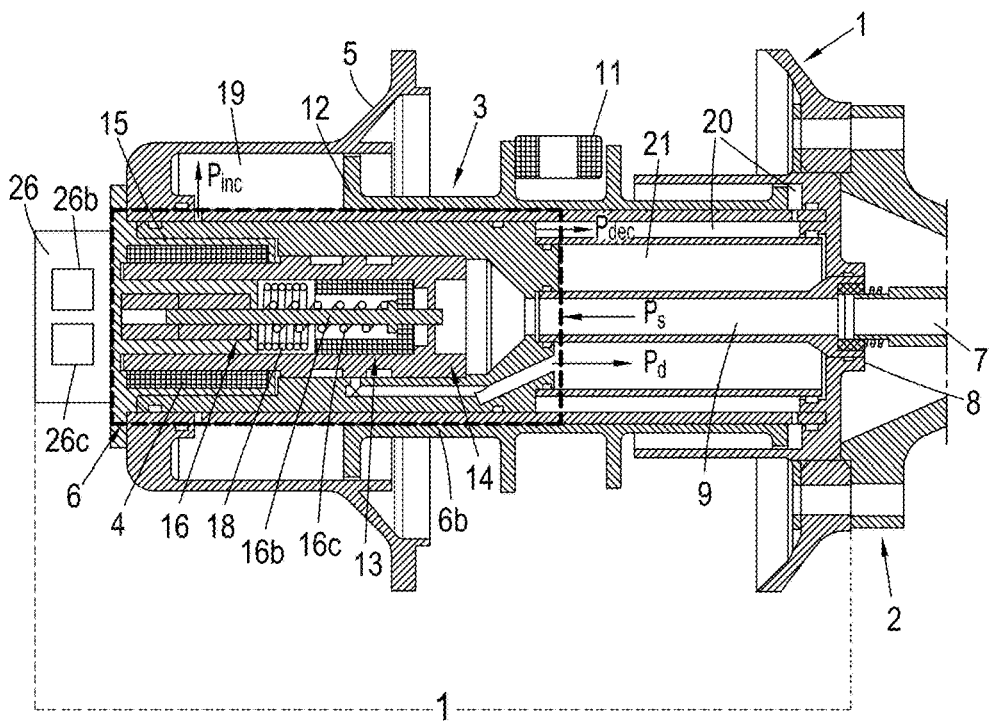
FIG. 2 is a sectional view of the propeller assembly of FIG. 1.

A first embodiment of a propeller assembly 1 comprising an hydraulic actuation control module 6 according to an embodiment of the present disclosure is illustrated in cutaway perspective view in FIG. 1 and sectional view in FIG. 2. It will be understood that a complete propeller could be formed from such an assembly together with other elements, such as propeller blades, hub etc. In this embodiment, the hydraulic actuator 3 controlled by the hydraulic actuation control module 6 is a pitch change actuator 3 for the propeller assembly 1. The propeller assembly 1 is driven to rotate by a rotating engine shaft 2 of an engine (not shown). The pitch change actuator 3 is fitted within a propeller hub, part of which is shown by reference number 5. Propeller blades (not shown) are mountable for rotation at eccentric blade connection 11, which translates linear motion of an actuator piston 12 into rotational motion of the blades, to thereby vary the pitch.

Recessed within the actuator 3 are increase pitch chamber 19 and decrease pitch chamber 20. These chambers may be considered as being part of increase pitch and decrease pitch circuits respectively. In this embodiment, a single static hydraulic supply line 7, that is centered in the rotating engine shaft 2, provides hydraulic fluid (e.g. oil) flow and pressure to the module 6 in the rotating propeller assembly 1 via hydraulic connection 8. In some embodiments the hydraulic connection 8 may be a mechanical seal or a hydrodynamic bearing. The hydraulic supply line 7 is static in relation to the rotation of the engine shaft (and thus propeller assembly 1)

The hydraulic supply line 7 provides fluid flow and pressure from (i.e. is supplied by) an entity relative to which the propeller assembly rotates, such as the engine driving the propeller (the static part of the engine i.e. not the rotating engine shaft) or a vehicle (e.g. aircraft) on which the propeller is installed. Such an entity can therefore be considered as a "static entity", since it is rotationally static with respect to the propeller. In one embodiment, hydraulic fluid flow and pressure is provided to the hydraulic supply line 7 from the engine lubrication system. The pressure of this lubrication fluid will be increased e.g. by a high pressure pump prior to being provided to the hydraulic supply line 7. In this embodiment, such a high pressure pump would therefore be installed on the engine. Thus, the fluid flow and pressure provided by the hydraulic supply line 7 may be considered as "high pressure" flow, with a pressure high enough necessary for the actuator. The skilled man would readily understand that exactly what this pressure is will depend on the particular system.

In some embodiments, the hydraulic supply line 7 will not supply a "high pressure" fluid that has been pressurized by e.g. a high pressure pump, but rather, will supply "low pressure" fluid that has not been pressurized, e.g. fluid directly from the engine lubrication system. A high pressure pump would then need to be installed on the propeller assembly 1 or within the module 6 to pressurize the fluid as necessary for use with the actuator 3. The first embodiment of FIGS. 1 to 6 may be modified in such a way. An embodiment in which the hydraulic supply line 7 supplies fluid that has not been pre-pressurized by a high pressure pump is described later in relation to the second embodiment of FIG. 7.

Figure 7:
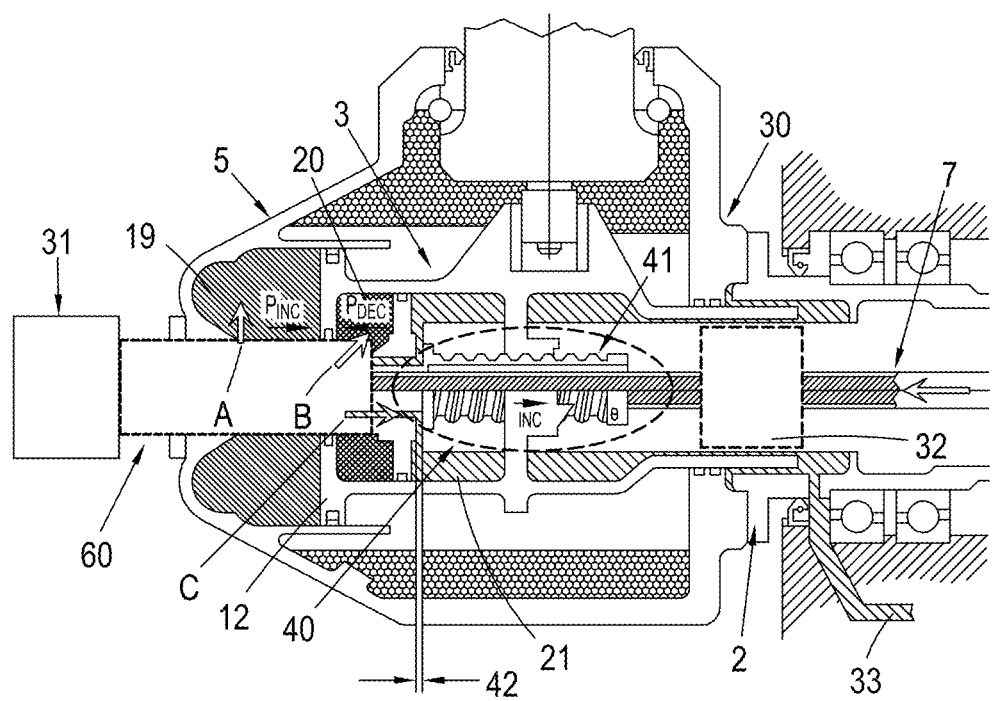
FIG. 7 is a sectional view of a second embodiment of a propeller assembly comprising an hydraulic actuation control module according to an embodiment of this disclosure.
Figure 8:
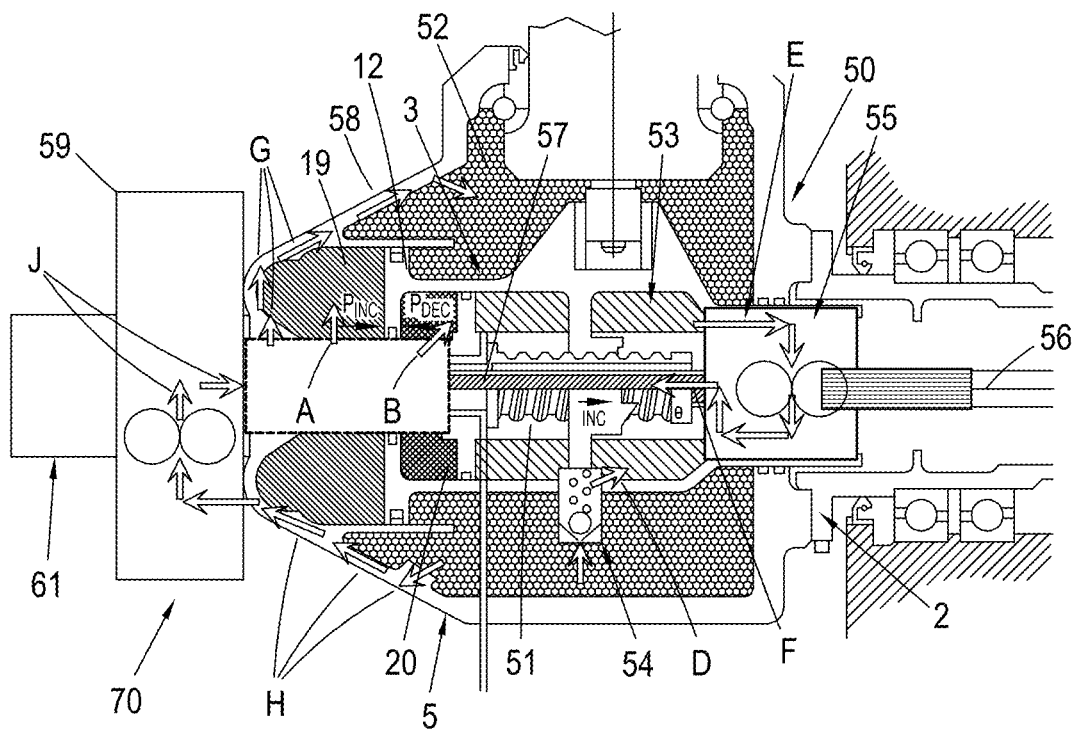
FIG. 8 is a sectional view of a third embodiment of a propeller assembly comprising an hydraulic actuation control module according to an embodiment of this disclosure.

Slidably received (see FIG. 6) within actuator 3 is the hydraulic actuation control module 6, which is a line replaceable unit (LRU). This module 6 includes an electronic control unit 26 (as shown in block form in FIG. 2 but omitted from FIGS. 1 and 3 to 6 for simplicity), torque servo valve motor 15, flow metering valve 14 and low pitch and overspeed protection solenoid 16. It also comprises a hydraulic supply line 9 and a drain chamber 21. Part of the embodiment of the module 6 is indicated within dashed lines in FIG. 2 to simplify the explanation of FIGS. 7 and 8, since this part may also be used in the embodiments of FIGS. 7 and 8. In FIGS. 7 and 8, the components within the dashed lines in FIG. 2 are not shown for simplicity, but their presence is implicit.

High pressure hydraulic supply fluid flow and pressure is received from the static supply line 7 into hydraulic supply line 9 within module 6 via hydraulic connection 8. The flow metering valve 14 receives hydraulic fluid flow and pressure from supply line 9 (see Ps arrow in FIG. 2). It meters this hydraulic fluid flow and pressure to the increase pitch and decrease pitch chambers 19, 20, in accordance with the control of the electronic control unit 26, see arrows Pinc and Pdec in FIG. 2. It furthermore drains fluid to the drain chamber 21, see arrow Pd in FIG. 2.

The electronic control unit 26 includes electrical device 26b embedded within the control unit 26 for receiving electrical power from a power providing entity relative to which the propeller assembly rotates, and an electrical device 26c for receiving commands from a command providing entity relative to which the propeller assembly rotates. This entity may broadly speaking be the same general entity, e.g. the engine that drives the propeller assembly or an aircraft on which the propeller assembly is installed, or they may be different entities e.g. electrical power is received from the engine and commands are received from the aircraft. However, the specific source of electrical power and the specific source of commands will be different. For example, electrical power may be received from the engine's electrical generator, the electrical generator of another engine, or the electrical network of a vehicle on which the propeller assembly is installed, whilst electrical commands may be received from the engine's control unit, the aircraft control unit or the flight deck.

Whilst in this embodiment the electrical device 26b of the electronic control unit 26 receives the electrical power and the electrical device 26c receives the commands, electrical devices for receiving power and commands may be installed elsewhere in the rotary propeller assembly 1, these devices then providing the power and commands to the electronic control unit 26.

The power and commands received by the electronic control unit 26 supply the motor 15 as well as the protection valve 13 and pitchlock system (in embodiments in which a pitchlock system is provided).

Suitable technology for the physical and electronic implementation of the transfer of power and communication through a rotating interface, e.g. from a static entity (e.g. static part of the engine) to a rotating propeller is known in the art for example from U.S. Pat. No. 6,851,929 and WO 2015/092201, and so will not be described in detail here. Other documents describing the provision of power and control through a rotating interface include WO 2007/061913 and U.S. Pat. No. 7,602,081. There is also the possibility to use wireless communication (telemetry) to provide a command signal to the propeller assembly 1.

It should be noted that in embodiments of this disclosure, where a static entity is referred to, it is meant an entity relative to which the propeller assembly rotates. It is not meant that the entity is entirely stationary. For example, a propeller assembly may rotate with respect to part of an engine, this part of the engine thereby being described as static. The engine and propeller assembly will however both be subject to linear motion of an aircraft in which they are installed.

The electronic control unit 26 utilises a closed-loop control system as known in the art to control the motor 15 that drives the metering valve 14. In the illustrated embodiment, metering valve 14 is a rotary direct drive servo-valve, however other types of metering valve known in the art, such as linear or rotary electrohydraulic servo valves or linear direct drive servo valves, may also be used.

Servo-valves are well known in the art, however as a very simplistic description, in one embodiment, the servo-valve 14 could be seen as having a typical 4-way valve architecture with four flow pass windows: W1 which provides fluid flow and pressure to the increase pitch chamber, W2 that drains the increase pitch chamber, W3 that provides fluid flow and pressure to the decrease pitch chamber, and W4 that drains the decrease pitch chamber. The opening of the flow pass windows is a function of the angular position of the metering valve 14, and the angular position is proportional to the commanded actuator speed (i.e. speed of the actuator piston) provided by the electronic control unit 26. Thus, by commanding the metering valve 14 to adjust the angular position of the valve 14 by motor 15, different windows can be opened to different extents to thereby control the quantities of hydraulic fluid flow and pressure provided from hydraulic supply line 9 to the increase pitch chamber 19 and decrease pitch chamber 20 (increase pitch and decrease pitch circuits). For example in the case of an increase pitch command, the valve will open W1 and W4 and close W2 and W3. However as noted above, this is a basic description and those skilled in the art will readily appreciate the details of such devices. Moreover this is only one example amongst many possible types of servovalve that could be used, as would be understood by one skilled in the art.

The control unit 26 also controls the protection valve 13 as described below in relation to FIG. 5.

FIG. 3 is a sectional view of the exemplary propeller assembly 1 of FIGS. 1 and 2, wherein hydraulic fluid flow and pressure is being supplied to the increase pitch chamber 19. The electronic control unit 26 (not shown in FIG. 3) has determined (or has been commanded) that the pitch of the blades should be increased, and has commanded the motor 15 to rotate the metering valve 14 to open the increase pitch flow pass window such that the hydraulic supply line 9 provides supply fluid flow and pressure to the increase pitch chamber 19. See the interface marked 19C. Thus, in this configuration, high pressure hydraulic fluid supplied from the static part of the engine via static high pressure supply line 7 and hydraulic connection 8 to hydraulic supply line 9 is fed to the increase pitch chamber 19, causing a piston (or yoke) 12 to translate and thereby increase the blade pitch via the eccentric connection 11. In this configuration, the metering valve 14 also opens the window to drain the decrease pitch chamber 20. Thus, the decrease pitch chamber 20 drains via the metering valve 14 to the drain circuit having drain chamber 21 see the interface marked 20D. Fluid in the drain chamber 21 is returned to the engine via a cavity in the engine shaft 2.

FIG. 4 is a sectional view of the exemplary propeller assembly 1 of FIGS. 1 to 3, wherein hydraulic fluid flow and pressure is being supplied to the decrease pitch chamber 20. This is a different section to that shown in FIG. 3. The electronic control unit 26 (not shown in FIG. 4) has determined (or has been commanded) that the pitch of the blades should be decreased, and has commanded the motor 15 to rotate the metering valve 14 to open the decrease pitch flow pass window such that the hydraulic supply line 9 provides supply flow and pressure to the decrease pitch chamber 20. See the interface marked 20C. Thus, in this configuration, high pressure hydraulic fluid supplied from the static part of the engine via static high pressure supply line 7 and hydraulic connection 8 to hydraulic supply line 9 is fed to the decrease pitch chamber 20, causing the piston 12 to translate and thereby decrease the blade pitch via the eccentric connection 11. In this configuration, the metering valve also opens the window to drain the increase pitch chamber 19, thus the increase pitch chamber 19 drains via the metering valve 14 to the drain circuit having drain chamber 21, see the interface marked 19D. Fluid in the drain chamber 21 is returned to the engine via a cavity in the engine shaft 2.

Also shown in FIGS. 3 and 4 is cavity 22. The purpose of this will be described later in relation to a protection valve 13. However with regard to FIGS. 3 and 4, it can simply be known that the cavity 22 contains a small amount of hydraulic fluid at a low pressure, that leaks from the hydraulic supply line 9.

FIG. 5 is a sectional view of the exemplary propeller assembly of FIGS. 1 to 4, when the module 6 is in "protection" mode. This cross section is a different section to that shown in FIGS. 1-3. Mechanisms to protect against e.g. an undesired decrease in blade pitch, such as due to mechanical, electronic or hydraulic failure, are known in the art. Such known mechanisms are installed in the static part of the engine that drives the propeller. However in an embodiment of the present disclosure, a protection valve 13 is provided in module 6 installed in the rotary propeller assembly 1. This is controlled by the electronic control unit 26 (not shown in FIG. 5).

This protection valve 13 provides a "protection mode" which enables the entire hydraulic fluid supply pressure from supply line 9 to be directed to the increase pitch chamber 19, thereby bypassing the flow metering valve 14. The protection valve 13 is controlled (via the electronic control unit 26) by a solenoid 16 comprising a coil 16a, an armature 16b and a spring 16c. The armature 16b is translatable (to left and right in the drawing) depending on whether the solenoid is energised.

In the "closed position" or "normal mode" of the protection valve 13, as shown in FIGS. 3 and 4, the solenoid 16 is not energised. The force of spring 16c acts to force the armature 16b to the right, with the portion 16b' of the armature abutting on the protection valve thus forcing the protection valve to the right. Spring 18 also acts to force the protection valve to the right. In this position, the end of the armature 16b" blocks flow from the high pressure supply line 9 so that it cannot enter a cavity 22. The spring 16c maintains the armature 16*b* and protection valve 13 in this position whilst the solenoid 16 is not energised.

The process of operation of the protection valve 13, in order to open the valve from this closed position, has two steps.

Firstly, in order to open the protection valve 13, the solenoid 16 is energised, causing the armature 16*b* to shunt to the left (as shown in FIG. 5) against the force of the spring 16*c*. This thereby opens the flowpath 23 for fluid flow and pressure from the high pressure supply line 9 to cavity 22.

Secondly, once the flowpath 23 is open and the cavity 22 is thereby connected with the supply pressure, the pressure of the fluid on the armature 16*b* forces the protection valve 13 also to the left against the force of spring 18 as can be seen in FIG. 5. This allows a flow pass between cavity 22 and the increase pitch chamber 19 and therefore a flow pass from the supply line 9 to the increase pitch chamber 19. I.e. the valve is open.

The protection valve 13 is then in "protection mode". This enables the entire hydraulic fluid supply pressure to be directed to the increase pitch chamber 19 via flowpath 23 and cavity 22, thereby bypassing the flow metering valve 14 (in this position the decrease pitch chamber 20 is connected to the drain 21). The blade pitch will then increase towards the feathered position. The protection valve 13 thus provides protection against low pitch and overspeed, and can also be used for feathering the propeller upon an engine shut down request or a feathering request from the aircraft control, the engine control or from the crew.

In some embodiments, one or more solenoids 16 could be arranged to control the protection valve 13. Furthermore, in some embodiments one or more additional protection valves may be provided e.g. as back-up valves should the main protection valve fail. This may be important for certification reasons.

FIG. 6 is a partial cutaway exploded view of the embodiment of FIG. 1 illustrating how an hydraulic actuation control module 6 may be installed in the actuator 3 of a propeller assembly 1. As can be seen, the module 6 is an integrated LRU that is arranged to be slideably installed in and removed from the actuator 3 of the propeller assembly 1.

The embodiment of FIGS. 1 to 6 as illustrated does not include a pitchlock protection system (and thus is a "counter weight" type of propeller in which the blades would be equipped with counter weights that drive them to increase pitch to a safe position in case of system failure). However, it will be readily appreciated by the skilled person that a pitchlock protection system may optionally be provided in the propeller assembly of FIGS. 1 to 6. Such a pitchlock protection system is described below in relation to the embodiment of FIG. 7.

Embodiments of the disclosure such as that described above provide important advantages. The interface between the propeller assembly 1 and the engine that drives the propeller is highly simplified. By providing the flow metering valve 14 and the electronic control unit 26 in the rotary propeller assembly 1 (rather than installing them in the static part of the engine as in prior art systems), only a single hydraulic supply line 7 need be provided from the static part of the engine to the rotary propeller assembly 1. The supplied fluid flow and pressure is then metered and distributed at the rotary propeller assembly. Thus there is only one hydraulic interface 8 with the engine. This is considerably simpler than providing multiple hydraulic fluid lines between the static part of the engine and the rotary propeller assembly as required in the prior art (e.g. decrease pitch pressure and increase pitch pressure lines from a metering valve on the static part of the engine, a pitchlock line from a pitchlock valve on the static part of the engine).

Additional advantages result from the provision of the components including the flow metering valve 14 and electronic control unit 26 within the module 6 for installation in the rotary propeller assembly 1. Construction of the propeller is simplified, since the propeller (including the propeller assembly) is placed on the engine shaft 2 and the module 6 is slid into place within the actuator 3 as discussed above in relation to FIG. 6. Fluid connection at the rotating interface between the static part of the engine and the rotating propeller assembly 1 may only require pressing a mechanical seal or a single hydrodynamic bearing 8. Maintenance is easier since the module 6 can simply be slid out of the actuator 3 and serviced or replaced. There is no need, as in prior art systems, for the blades to be in a certain position in order to access the controller, metering valve etc. installed in the static part of the engine. The module 6 is easily removable regardless of the position of the blades. This configuration also reduces the weight of the propeller which offers obvious advantages.

Whilst important advantages are provided by utilising the module approach as discussed above, nevertheless it will be understood that in some embodiments it is not essential to provide a module, but rather the flow metering valve 14 and electronic control unit 26 can be installed individually within the propeller assembly 1. The advantages associated with needing to have only a single hydraulic supply to the rotary propeller assembly are still provided.

FIG. 7 is a sectional, partially simplified view of a second embodiment of a propeller assembly 30 comprising an hydraulic actuation control module 60 according to an embodiment of this disclosure. Some parts performing the same functions as in the first embodiment of FIGS. 1 to 6 are given the same numbers.

The propeller assembly 30 of FIG. 7 includes a pitchlock system 40, and thus the illustrated propeller assembly architecture is different to that of the first embodiment of the propeller assembly 1. However, a large part of the embodiment of the hydraulic actuation control module 6 as used in FIGS. 1 to 6 is used in this embodiment of the propeller assembly 30 of FIG. 7. The part of module 6 that is used is shown in dashed lines in FIGS. 2 and 7. The details of this part of the module 6 are omitted from FIG. 7 for simplicity, and FIGS. 1 to 6 can be referred to for full details. Arrows A, B and C illustrate from where fluid flow and pressure is provided to the increase pitch, decrease pitch chambers and the drain respectively. The drain from the hydraulic actuation module 6 is returned to the engine via return line 33.

An electronic control unit 31 forms part of module 60. This unit 31 provides power and control for the motor 15, metering valve 14 and protection valve 13, in the same way as the electronic control unit 26 of FIGS. 1 to 6. In this embodiment, it also provides commands for the pitchlock system 40.

The pitchlock system 40 comprises a pitchlock screw 41 in the middle of the piston (or yoke) 12 and has a pitchlock gap 42. What is different to known propellers is that the commands for the pitchlock system are provided by the electronic control unit 31 of the module 6 which is installed in the rotary propeller assembly 30, as opposed to being provided by a control unit associated with the static part of the engine. Such a pitchlock system is an optional feature.

In FIG. 7, the box 32 illustrated with dashed lines includes the interface between the static hydraulic supply line 7 in the engine shaft 2 and the propeller assembly 30. This interface may comprise a hydraulic connection 8 as in the first embodiment.

The hydraulic fluid flow and pressure provided by supply line 7 may have been pressurised by a high pressure pump as described above in relation to FIGS. 1 to 6. In this case, the high pressure hydraulic fluid flow received is supplied to the module 6.

Alternatively, it may not have been pre-pressurised, e.g. the fluid flow may come directly from an engine lubrication system. In this case, box 32 also comprises a high pressure pump, such as a gear or screw pump provided at the inlet to the propeller assembly 30. This high pressure pump pressurises the fluid flow received from hydraulic supply line 7. This fluid flow and pressure is then supplied to the module 6. In this case, in one embodiment, the static hydraulic supply line 7 also functions as a static shaft on which the high pressure pump is mechanically mounted. The relative motion between the engine shaft 2 and the static supply line/shaft 7 energises the high pressure pump. In other embodiments, other means may be provided for driving the pump. Furthermore, a gear train or other type of shaft could be used to accommodate different locations of the high pressure pump in different architectures.

Thus, in this embodiment, a low pressure oil supply can be used: a high pressure supply is not necessary because a pump is provided to pressurise the fluid flow. This is an advantage for interfacing with the engine because the engine manufacturer could directly provide low pressure oil from the turbomachinery lubrication circuit. It will be understood that this optional feature of the high pressure pump may equally be applied to other embodiments of the propeller assembly such as that of FIGS. 1 to 6. It may be used with or without a pitchlock system.

Whilst the high pressure pump is described as interfacing with the static supply line 7 at the inlet to the propeller assembly 30, it may in other embodiments be provided as part of module 6.

FIG. 8 is a sectional, partially simplified view of a third embodiment of a propeller assembly 50 comprising an hydraulic actuation control module 70 according to an embodiment of this disclosure. Some parts performing the same functions as in the first embodiment of FIGS. 1 to 6 are given the same numbers.

The propeller assembly 50 includes a pitchlock system 51, as in the propeller assembly 30 of FIG. 7. It will not be described further here. As with the propeller assembly 30 of FIG. 7, a large part of the hydraulic actuation control module 6 as used in the first embodiment of FIGS. 1 to 6 is used in this embodiment of FIG. 8. The part of module 6 that is used is shown in dashed lines in FIG. 2 and the dashed lines in FIG. 8 show where the part of the module 6 may be installed. The details of this part of module 6 are omitted from FIG. 8 for simplicity, and FIGS. 1 to 6 can be referred to for full details. Arrows A, B and G illustrate the provision of fluid flow and pressure to the increase pitch, decrease pitch chambers and the drain respectively.

An electronic control unit 61 forms part of module 70. In this embodiment, this unit 61 provides power and control for the motor 15, metering valve 14, protection valve 13, commands for the pitchlock system 51 and commands for an auxiliary system e.g. auxiliary pump 59 (described below).

The embodiment of FIG. 8 has an "autonomous" propeller oil system, in the sense that it does not require oil to be provided from the engine (or elsewhere) so no hydraulic interface is required with the static part of the engine, (though a mechanical interface is clearly needed for driving the pump as described later). Instead, oil reservoirs are embedded within the propeller assembly 50. Thus, the propeller assembly 50 has a "closed oil circuit". Within the propeller assembly 50 is a hub cavity reservoir 52 and an actuator cavity reservoir 53. The oil contained in the hub cavity reservoir 52 is maintained at a constant pressure via a pressure regulating valve 54. The rotation of this reservoir (as part of the rotating propeller assembly) enables air contained in the oil to be removed (centrifugal deaerator).

The overflow of this pressurised oil at the outlet of the pressure regulating valve 54 (see arrow D) is collected inside the actuator cavity reservoir 53. This oil is used as inlet to a main pump 55 (see arrow E). This main pump 55 is a high pressure pump such as a gear or screw pump, which is installed inside the actuator cavity and interfaces with a static shaft 56. Relative motion of the engine shaft 2 and the static shaft 56 drives the main pump 55 as soon as the propeller assembly 50 is rotating. This static shaft 56 is a static point centered inside the rotating engine shaft 2. The main pump 55 provides high pressure supply flow to the hydraulic actuation control module 6 (see arrow F) via high pressure supply line 57. A gear train or other type of shaft could be used to accommodate different locations of the main pump 55 in different architectures.

Whilst in this embodiment the static shaft 56 drives the main pump 55, in other embodiments the main pump 55 could be driven by an electrical motor.

The drain flow of the module 6 (see arrows G) is fed via piping 58 that could be part of hub casting within the hub 5 to the hub cavity reservoir 52. This then feeds the actuator cavity reservoir 53 as described above. In addition, in this embodiment the module 6 comprises an auxiliary electrical pump 59, which forms an auxiliary system with the hub cavity reservoir 52 and the regulating valve 54. If the main supply system (e.g. the main supply circuit, actuator cavity reservoir 53, main pump 55) fails, the regulating valve 54 will close and will ensure a given amount of oil from the hub cavity reservoir 52 is available for feeding the auxiliary electrical pump 59 (see arrows H). This auxiliary electrical pump 59 supplies the hydraulic actuation module 6, see arrows J. Such a segregated hydraulic supply for auxiliary supply may be needed for compliance with certification requirements. In alternative embodiments, the auxiliary electrical pump may be installed directly in the propeller assembly e.g. within the hub 5 rather than being part of module 6.

Embodiments such as that of FIG. 8 provide the advantage that no oil interface is required with the static part of the engine, thus simplifying the interface with the engine.

The concept of an auxiliary system installed in a propeller assembly, comprising a pressurised oil reservoir, pressure regulating valve and an electrical auxiliary pump, similar to that described in relation to FIG. 8, can also be applied to other embodiments of the propeller assembly such as that of FIGS. 1-6 and FIG. 7. The pressure regulating valve and electrical auxiliary pump may be provided in the module 6, or may be installed directly in the propeller assembly. If e.g. the main supply circuit fails, the engine oil supply is lost, any leakages within the system induce a loss of supply fluid flow and pressure, or if a high pressure pump is provided in the propeller assembly this fails thus resulting in failure of a high pressure fluid flow supply, then the auxiliary system will be activated. The pressure regulating valve will close and a given oil volume contained in the oil reservoir will be available to feed the electrical auxiliary pump which will supply the hydraulic actuation module 6. The drain is returned to the oil reservoir. The electronic control unit e.g.

26 of FIG. 1 or 31 of FIG. 7, may provide power and commands for the auxiliary system. Such an auxiliary system provides benefits in terms of segregation of the hydraulic supply.

Furthermore, in all propeller architectures, some oil is required within the propeller hub for lubrication of the blade root retention bearing, which in known propellers is provided by an oil cavity within the propeller hub. This oil could be used as the auxiliary oil supply for the auxiliary system described above, rather than needing to provide an additional pressurised oil reservoir. This would provide significant weight savings in the powerplant (i.e. the engine+propeller combination).

It will be understood that the advantages described above in relation to the first embodiment of FIGS. 1 to 6, are equally applicable to the embodiments of FIGS. 7 and 8. Moreover, as with the first embodiment, whilst important advantages are provided by utilising the module approach as discussed above, nevertheless it will be understood that the embodiments of FIGS. 7 and 8 could be modified to not use a module, but instead install the module components individually within the rotary propeller assembly e.g. within the hub. The advantages associated with the need to have only a single hydraulic supply to the rotary propeller assembly (FIG. 7) and the provision of oil reservoirs within the propeller assembly itself (FIG. 8) would still be provided even if a module were not used.

The exemplary embodiments described above are concerned with an aircraft propeller, however the present disclosure is equally applicable to other propellers such as propellers for boats and wind turbines.

The above description is of specific embodiments only and it will be appreciated that variations may be made to the embodiments without departing from the broad scope of the disclosure as defined by the following claims.

The invention claimed is:

1. A hydraulic actuation control module for installation in a hydraulic pitch change actuator of a propeller assembly, the module comprising:
   an exterior circumferential surface defining a first part of an increase pitch hydraulic fluid circuit and a first part of a decrease pitch hydraulic fluid circuit thereon;
   a flow metering valve within an interior of the module;
   an electronic control unit that controls the flow metering valve; and
   a plurality of passages that provide fluid communication between the flow metering valve and the first part of the increase pitch hydraulic fluid circuit and between the flow metering valve and the first part of the decrease pitch hydraulic fluid circuit;
   wherein the exterior circumferential surface is configured to engage with an interior circumferential surface of the hydraulic pitch actuator when the module is installed therein, the interior circumferential surface of the hydraulic pitch change actuator defining a second part of the increase pitch hydraulic fluid circuit and a second part of the decrease pitch hydraulic fluid circuit thereon.

2. A module as claimed in claim 1, wherein the flow metering valve meters hydraulic fluid flow and pressure through the plurality of passages, the first parts of the increase and decrease pitch hydraulic fluid circuits, and, when the module is installed in the hydraulic pitch change actuator, the second parts of the increase and decrease pitch hydraulic fluid circuits, and to an increase pitch chamber of the pitch change actuator and a decrease pitch chamber of the pitch change actuator, in accordance with the control of the electronic control unit.

3. A module as claimed in claim 2, wherein the flow metering valve is a rotary electrohydraulic servo valve or rotary direct drive valve which meters hydraulic fluid flow and pressure according to an angular position to which it is rotated; or
   wherein the flow metering valve is a linear electrohydraulic servo valve or a linear direct drive valve.

4. A module as claimed in claim 1, further comprising a protection valve that enables hydraulic fluid flow and pressure from an hydraulic fluid flow and pressure supply circuit to be supplied to first part of the increase pitch hydraulic fluid circuit while bypassing the flow metering valve;
   wherein the protection valve is controlled by at least one solenoid such that the solenoid moves the protection valve to open a flow path between the hydraulic fluid flow and pressure supply circuit and the first part of the increase pitch chamber hydraulic fluid circuit when the solenoid is energised, and such that the solenoid moves the protection valve to close the flow path between the hydraulic fluid flow and pressure supply circuit and the first part of the increase pitch hydraulic fluid circuit when the solenoid is not energised.

5. A module as claimed in claim 1, wherein a high pressure pump is installed in the module for pressurising the hydraulic fluid prior to being received by the flow metering valve.

6. A propeller assembly comprising:
   a hydraulic pitch change actuator; and
   a hydraulic actuation control module installed in the hydraulic pitch change
   actuator, the hydraulic actuation control module comprising:
      a flow metering valve that supplies hydraulic fluid flow and pressure to the hydraulic pitch change actuator;
      an electronic control unit that controls the flow metering valve; and
   a pitchlock system, wherein the electronic control unit provides control for the pitchlock system.

7. A propeller assembly as claimed in claim 6, wherein the propeller assembly receives a hydraulic fluid supply via a single static hydraulic supply line for supplying the flow metering valve; and wherein the propeller assembly comprises a hydraulic fluid reservoir for supplying the flow metering valve;
   wherein the propeller assembly comprises a high pressure pump that pressurises the hydraulic fluid prior to being received by the flow metering valve.

8. A propeller assembly as claimed in claim 7, wherein the propeller assembly further comprises an auxiliary pump that pumps hydraulic fluid from a segregated part of the hydraulic fluid reservoir or from a second independent fluid reservoir within the propeller assembly to the metering valve in the event of failure of the high pressure pump or loss of supply from a supply circuit including the single static hydraulic fluid supply line;
   wherein the propeller assembly or hydraulic actuation module further comprises a regulating valve for pressurising the second independent fluid reservoir.

9. An aircraft comprising a propeller assembly as claimed in claim 6, wherein the aircraft comprises an engine for driving the propeller assembly.

10. A propeller assembly as claimed in claim 6, wherein the flow metering valve receives a hydraulic fluid supply from an entity relative to which the propeller assembly rotates;
   wherein the flow metering valve receives a hydraulic fluid supply from a static part of an engine that drives the propeller assembly, preferably from the engine lubrication system; or from an aircraft system of an aircraft on which the propeller assembly is installed.

11. A propeller assembly as claimed in claim 6, wherein the electronic control unit receives electrical power from a power providing entity relative to which the propeller assembly rotates, wherein preferably the power providing entity is an electrical generator of an engine that drives the propeller assembly, or an electrical supply of an aircraft on which the propeller assembly is installed; or
   wherein the electronic control unit receives electronic commands from a command providing entity relative to which the propeller assembly rotates, wherein the command providing entity is an engine control unit of an engine that drives the propeller assembly, an aircraft control unit of an aircraft on which the propeller assembly is installed or the cockpit of an aircraft on which the propeller assembly is installed.

12. A method of installing an hydraulic actuation control module in a hydraulic pitch change actuator of a propeller assembly, the hydraulic actuation control module comprising a flow metering valve and an electronic control unit that controls the flow metering valve; wherein the method comprises:
   sliding the hydraulic actuation control module into a housing within the hydraulic pitch change actuator such that the flow metering valve can supply hydraulic fluid flow and pressure to increase and decrease pitch chambers of the hydraulic pitch change actuator in accordance with the control of the electronic control unit.

13. A propeller comprising:
   a propeller hub comprising:
      a hydraulic pitch change actuator;
      a flow metering valve that supplies hydraulic fluid flow and pressure to the hydraulic pitch change actuator; and
   an electronic control unit that controls the flow metering valve;
   wherein the flow metering valve is arranged to meter hydraulic fluid flow and pressure to increase and decrease pitch chambers of the pitch change actuator, in accordance with the control of the electronic control unit; and
   wherein the flow metering valve receives a hydraulic fluid supply via a single static hydraulic supply line and wherein the propeller comprises a hydraulic fluid reservoir and the flow metering valve receives a hydraulic fluid supply from the reservoir.

* * * * *